(12) United States Patent
Nelson (10) Patent No.: US 9,897,117 B2
(45) Date of Patent: Feb. 20, 2018

(54) ELECTROMAGNETIC POWERTRAIN SYSTEM

(71) Applicant: NEMESYS Engineering, LLC, Burnsville, MN (US)

(72) Inventor: Andrew Michael Nelson, Shakopee, MN (US)

(73) Assignee: Nemesys Engineering, LLC, Burnsville, MN (US)

(*) Notice: Subject to any disclaimer, the term of this patent is extended or adjusted under 35 U.S.C. 154(b) by 378 days.

(21) Appl. No.: 14/688,643

(22) Filed: Apr. 16, 2015

(65) Prior Publication Data

US 2016/0305457 A1  Oct. 20, 2016

(51) Int. Cl.

| | |
|---|---|
| *H02K 7/06* | (2006.01) |
| *F15B 21/08* | (2006.01) |
| *B60K 8/00* | (2006.01) |
| *F16D 63/00* | (2006.01) |
| *H02K 41/02* | (2006.01) |
| *B60K 1/00* | (2006.01) |
| *B60T 13/74* | (2006.01) |
| *H02K 33/00* | (2006.01) |
| *H02K 16/00* | (2006.01) |
| *F16D 121/20* | (2012.01) |

(52) U.S. Cl.
CPC ............... *F15B 21/08* (2013.01); *B60K 1/00* (2013.01); *B60K 8/00* (2013.01); *B60T 13/748* (2013.01); *F16D 63/002* (2013.01); *H02K 7/06* (2013.01); *H02K 16/00* (2013.01); *H02K 33/00* (2013.01); *H02K 41/02* (2013.01); *F16D 2121/20* (2013.01)

(58) Field of Classification Search
CPC .......... H02K 7/06; H02K 16/00; H02K 33/00; H02K 41/02; H02K 7/075; H02K 7/1876
USPC ................ 310/15, 20, 23–24, 26, 30, 37, 46
See application file for complete search history.

(56) References Cited

U.S. PATENT DOCUMENTS

| | | | | |
|---|---|---|---|---|
| 3,878,412 | A * | 4/1975 | Kurpanek | ............. H01H 51/10 173/117 |
| 4,317,058 | A | 2/1982 | Blalock | |
| 4,342,920 | A * | 8/1982 | Bucknam | ................ F02B 71/04 123/46 E |
| 4,404,503 | A * | 9/1983 | Ward | ..................... H02K 33/14 310/30 |

(Continued)

*Primary Examiner* — Thanh Lam
(74) *Attorney, Agent, or Firm* — Merchant & Gould P.C.

(57) ABSTRACT

An electromagnetically operated powertrain system is provided. The system includes a plurality of cylinder assemblies arranged in parallel at least partially along a vehicle. Each of the cylinder assemblies may include one or more cylinders, one or more electromagnetic devices secured to at least one of the ends of each cylinder, one or more pistons reciprocatingly received in the cylinders, and a piston rod coupled to the pistons. Each of the pistons includes a permanent magnet that creates a magnetic field interacting with an electromagnetic field generated by each of the electromagnetic devices. A pulling and/or pushing force may be selectively generated by the magnetic field and the electromagnetic field to enable the pistons to reciprocate within the cylinders. A crankshaft is coupled to the piston rods of the plurality of cylinder assemblies and directly coupled to at least one of front and rear axles of a vehicle.

22 Claims, 6 Drawing Sheets

(56) References Cited

U.S. PATENT DOCUMENTS

| | | | |
|---|---|---|---|
| 4,507,579 A * | 3/1985 | Turner | H02K 7/065 |
| | | | 310/15 |
| 4,510,420 A | 4/1985 | Sasso et al. | |
| 4,631,455 A | 12/1986 | Taishoff et al. | |
| 4,692,673 A * | 9/1987 | DeLong | F04B 17/046 |
| | | | 310/17 |
| 5,592,036 A | 1/1997 | Pino | |
| 5,637,936 A | 6/1997 | Meador | |
| 6,278,204 B1 | 8/2001 | Frenette | |
| 7,105,958 B1 | 9/2006 | Elmaleh | |
| 7,330,094 B2 | 2/2008 | McCarthy | |
| 7,793,634 B2 | 9/2010 | Elmaleh | |
| 8,058,755 B2 | 11/2011 | Hoogerhyde | |
| 8,188,690 B2 | 5/2012 | Miles et al. | |
| 8,324,762 B2 | 12/2012 | Keller | |
| 8,324,763 B2 | 12/2012 | Gosvener | |
| 8,336,409 B2 | 12/2012 | Edwards | |
| 8,344,560 B2 | 1/2013 | Gosvener | |
| 8,446,112 B2 | 5/2013 | Miles et al. | |
| 8,786,143 B2 | 7/2014 | Gosvener | |
| 2002/0121815 A1 | 9/2002 | Sullivan | |
| 2011/0193503 A1* | 8/2011 | Miles | H02K 7/075 |
| | | | 318/129 |
| 2012/0098357 A1 | 4/2012 | Hunstable | |
| 2012/0153758 A1 | 6/2012 | Perry | |
| 2012/0242174 A1 | 9/2012 | Wilson, II et al. | |
| 2014/0097708 A1* | 4/2014 | Simcox | H02K 33/02 |
| | | | 310/24 |

* cited by examiner

FIG. 6

ELECTROMAGNETIC POWERTRAIN SYSTEM

BACKGROUND OF THE INVENTION

Field of the Invention

The present invention is directed to an electromagnetically operated vehicle powertrain.

Prior Art

Electromagnetically operated engines are known in the art. Electromagnetically operated engines convert pulsed electromagnetic energy into mechanical and kinetic energy, which is delivered to run a vehicle. Typically, the electromagnetically operated engine includes an engine housing or block fitted with a crankshaft, cylinders for receiving magnetic pistons operatively coupled to the crankshaft, and electromagnets disposed in the engine head for magnetically attracting and repelling the magnetic pistons in the cylinders in a selected sequence, thereby driving the crankshaft. The engine generally drives the magnetic piston in a cylinder by alternating a direction of the electrical current flowing through an electromagnetic coil. The alternating electrical current alternates the polarity of a magnetic core, which is then utilized to alternately attract and repel the magnetic piston in the cylinder.

When used in a vehicle, such electromagnetically operated engines typically require conventional powertrain elements to deliver mechanical and kinetic energy to a final drive output. Examples of the powertrain elements required include a transmission, an exhaust system, a gas fuel system, a brake system, a clutch, and several fluid systems used for such conventional powertrain elements.

It can be seen that a new and improved system for electromagnetically operating a vehicle. Such a system should provide a simplified electromagnetic powertrain that removes at least some conventional powertrain elements. Such a system should allow more room for more electromagnetic cylinder assemblies to generate more power. Further, such a system should provide an electromagnetic powertrain that can evenly distribute its weight over the vehicle, reduce the weight of the vehicle, and lower the center of mass of the vehicle, thereby increasing driving performance of the vehicle. The present invention addresses these as well as other problems associated with electromagnetically operated engines or vehicles.

SUMMARY OF THE INVENTION

The present invention is directed to an electromagnetically operated powertrain system. The system includes a plurality of cylinder assemblies arranged at least partially along a vehicle. Each of the cylinder assemblies may include a first cylinder, an electromagnetic device secured to one of the ends of the first cylinder, a first piston reciprocatingly received in the first cylinder, and a first piston rod coupled to the first piston. The first piston includes a permanent magnet that creates a magnetic field interacting with an electromagnetic field generated by the electromagnetic device. A pulling and/or pushing force may be selectively generated by the magnetic field and the electromagnetic field to enable the first piston to reciprocate within the first cylinder. The system also includes a crankshaft extending along at least a portion of the vehicle. The crankshaft is coupled to the first piston rods of the plurality of cylinder assemblies and directly coupled to at least one of front and rear axles of a vehicle so that reciprocating motions of the first pistons within the first cylinders are converted to a rotational motion of the crankshaft that is transferred to a rotation of the axles of wheels. The plurality of cylinder assemblies may be arranged in parallel at least partially along a vehicle. In certain examples, the plurality of cylinder assemblies may be arranged in parallel along the crankshaft.

In certain examples, each of the cylinder assemblies may further include another electromagnetic device secured to the other end of the first cylinder and configured to selectively generate a pulling and/or pushing force.

In certain examples, each of the cylinder assemblies may further include a second cylinder, an electromagnetic device secured to one of the ends of the second cylinder, a second piston reciprocatingly received in the second cylinder, and a second piston rod coupled between the second piston and the crankshaft. The second piston includes a permanent magnet that creates a magnetic field interacting with an electromagnetic field generated by the electromagnetic device. The second cylinder and second piston may be configured similarly to the first cylinder and first piston and arranged to be opposite to the first cylinder and first piston with the crankshaft therebetween. In certain examples, each of the cylinder assemblies may further include another electromagnetic device secured to the other end of the second cylinder and configured to selectively generate a pulling and/or pushing force.

In certain examples, the electromagnetic devices include a coil assembly configured to generate an electromagnetic field, and a housing securing the coil assembly therein. The housing has a first portion and a second portion with the first portion arranged toward the piston within the cylinder, and with the second portion at least partially surrounding the coil assembly and configured to direct the electromagnetic field toward the first portion of the housing. The first and second portions may be made of different materials. In other examples, the housing of the electromagnetic devices may be made of a single material without distinguishing the first and second portions. In yet other examples, the electromagnetic devices are configured without a housing.

In certain examples, the axle of wheels includes a permanent magnet disposed at least partially therearound. A brake member may be arranged at least partially around the permanent magnet and operable through a brake input device of the vehicle. The brake member may include paramagnetic material and is movable between a first position and a second position as the brake input device is operated. In the first position, the brake member moves adjacent the permanent magnet to generate a braking effect on the first axle of wheels. In the second position, the brake member moves away from the permanent magnet to reduce the braking effect on the first axle of wheels. The paramagnetic material of the brake member and the permanent magnet of the spinning axle may also generate a voltage to recharge one or more batteries of the vehicle.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

DETAILED DESCRIPTION OF THE PREFERRED EMBODIMENT

Figure 1:
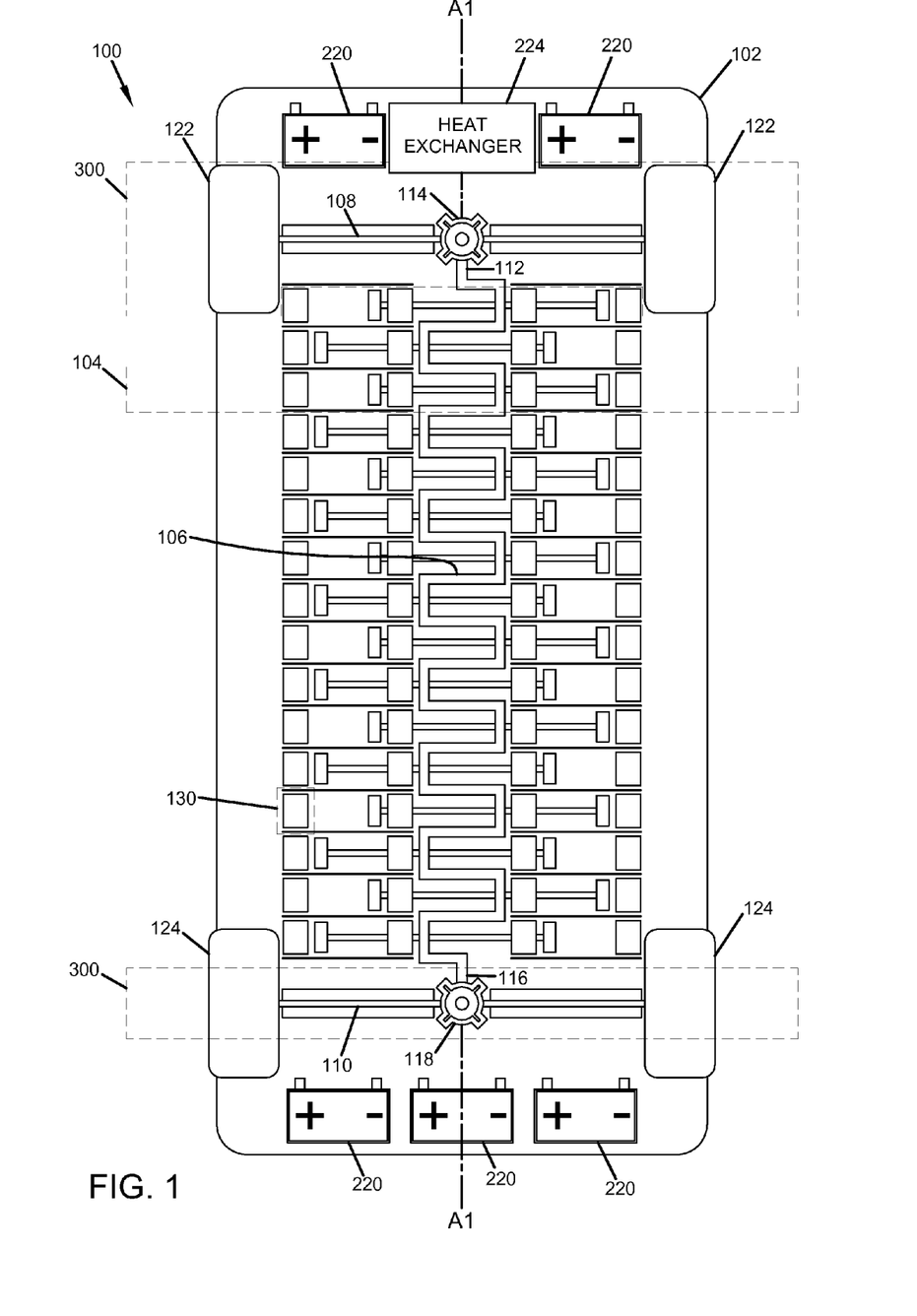
FIG. 1 is a schematic top view of an electromagnetic powertrain system mounted to a vehicle in accordance with the principles of the present invention.
Figure 2:
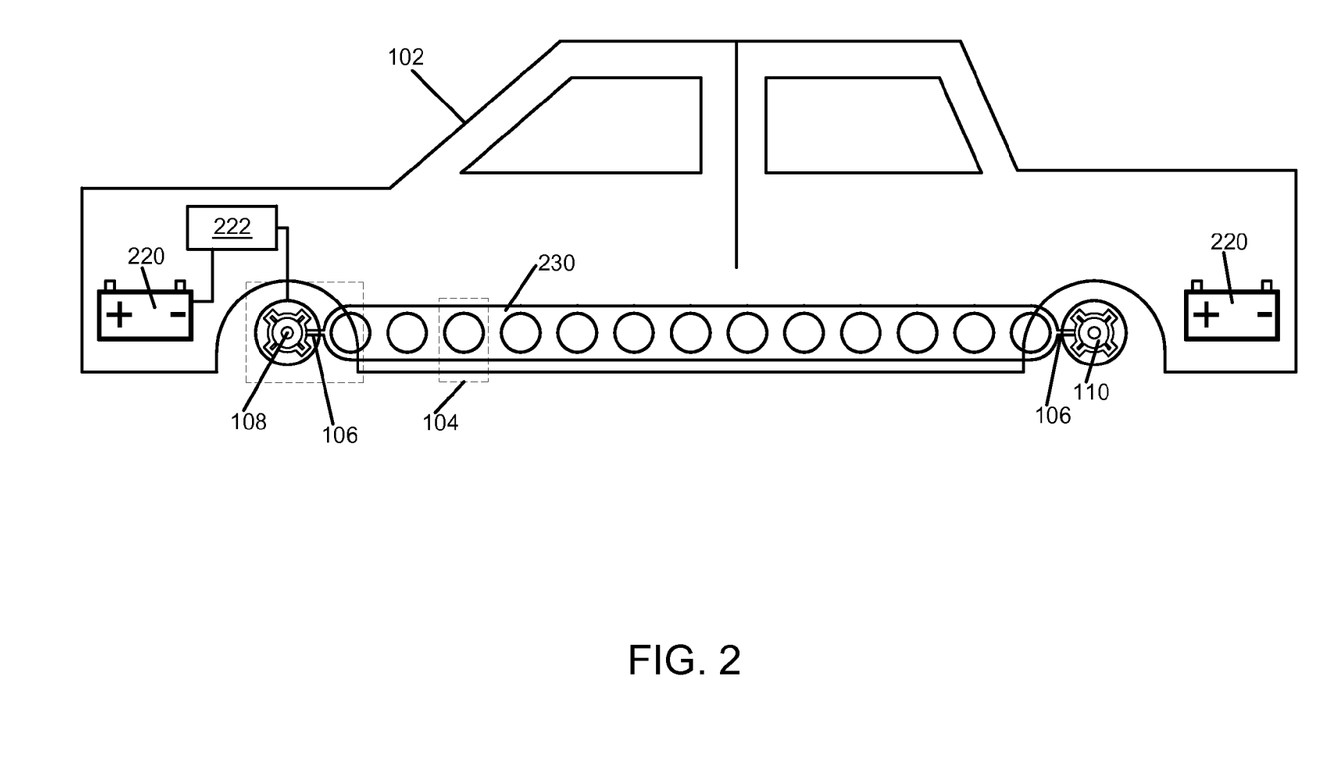
FIG. 2 is a schematic side view of the electromagnetic powertrain system shown in FIG. 1.

Referring now to the drawings, in particular to FIGS. 1 and 2, there is shown an electromagnetic powertrain system, generally designated (100), mounted to a vehicle (102). The powertrain system (100) includes a plurality of cylinder assemblies (104) and a crankshaft (106) operable coupled to the plurality of cylinder assemblies (104). The cylinder assemblies (104) are arranged along a longitudinal axis (A1) of the vehicle (102). In certain examples, the cylinder assemblies (104) can be arranged in parallel as illustrated in FIG. 1. The crankshaft (106) extends along at least a portion of the vehicle (102). In the illustrated example, the crankshaft (106) extends along the longitudinal vehicle axis (A1) between a front drive axle (108) and a rear drive axle (110). A first end (112) of the crankshaft (106) is operably coupled to the front axle (108) through a first gear mechanism (114), and a second end (116) of the crankshaft (106) is operably coupled to the rear axle (110) through a second gear mechanism (118). In certain examples, the crankshaft (106) can be operably coupled to only one of the front and rear axles (108, 110). The first and second gear mechanisms (114, 118) are configured to transfer a rotational motion of the crankshaft (106) to the front and rear axles (108, 110), which then rotate front and rear wheels (122, 124). In certain examples, the crankshaft (106) can be coupled to only one of the front and rear axles (108, 110). In certain examples, the first and second gear mechanism (114, 118) are configured as front and rear differentials, which operate to transmit torque to the front wheels (122) and the rear wheels (124), respectively. In certain examples, the first and second gear mechanism (114, 118) can include universal joints. As illustrated in FIG. 2, the powertrain system (100) may be disposed at the bottom of the vehicle (102) along the crankshaft (106) and aligned with the front and rear axles (108, 110) at the same level or height.

In certain examples, at least one of the cylinder assemblies (104) is operably coupled to one of the front and rear axles (108, 110) either directly or through a crankshaft (106), and the other cylinder assemblies (104) are operably coupled to the other of the front and rear axles (108, 110) either directly or through a crankshaft (106). In other examples, at least one of the cylinder assemblies (104) can be directly coupled to at least one of the wheels (122, 124).

In certain examples, a driveshaft is separately provided and connected between the crankshaft (106) and at least one of the front and rear axles (108, 110) to transfer torque from the crankshaft (106) to the associated axle (108, 110). In some examples, a transmission may further be provided with the crankshaft (106) and the driveshaft.

Figure 3:
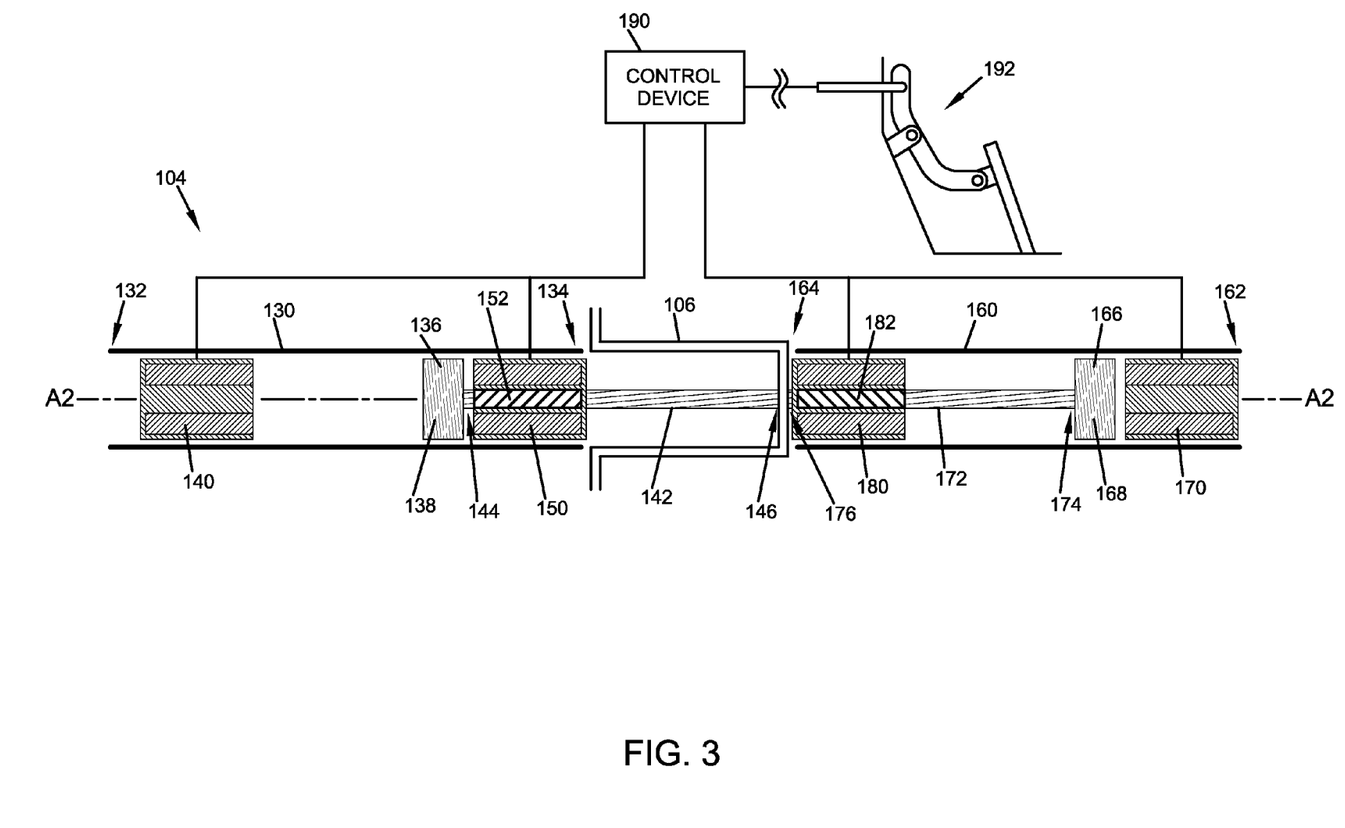
FIG. 3 is a schematic side view of an electromagnetic cylinder assembly used in the power system shown in FIG. 1.

Referring to FIG. 3, an example of the cylinder assembly (104) is described. The cylinder assembly (104) includes a first cylinder (130) having a top end (132) and a bottom end (134), and a first piston (136) configured to reciprocate within the first cylinder (130) along a cylinder axis (A2). The first cylinder (130) is arranged such that the bottom end (134) is located adjacent the crankshaft (106) while the top end (132) is located away from the crankshaft (106). The first piston (136) includes a permanent magnet (138) secured thereto. In other examples, the first piston (136) may be at least partially made of a permanent magnet (138). In certain examples, the permanent magnet (138) is made of Neodymium or other rare-earth magnetic elements. A top electromagnetic device (140) is disposed at the top end (132) of the first cylinder (130) and configured to generate an electromagnetic field to interact with the first piston (136) when the first piston (136) is positioned adjacent the top electromagnetic device (140). The cylinder assembly (104) further includes a first piston rod (142) extending through the bottom end (134) of the first cylinder (130). A first rod end (144) of the first piston rod (142) is secured to the first piston (136), and a second rod end (146) of the first piston rod (142) is coupled to the crankshaft (106). Accordingly, a reciprocating motion of the first piston (136) within the first cylinder (130) is converted to a rotational motion of the crankshaft (106), which is then transferred to a rotation of the first and second axles (108, 110).

The cylinder assembly (104) may further include a bottom electromagnetic device (150) disposed at the bottom end (134) of the first cylinder (130). The bottom electromagnetic device (150) defines a piston rod passage (152) through which the first piston rod (142) extends between the first piston (136) and the crankshaft (106).

In the illustrated examples, the cylinder assembly (104) includes both of the top and bottom electromagnetic devices (140, 150). In certain examples, however, the cylinder assembly (104) may include the bottom electromagnetic device (150) without the top electromagnetic device (140), or may include the top electromagnetic device (140) without the bottom electromagnetic device (150).

The cylinder assembly (104) may further include a second cylinder (160) arranged oppositely to the first cylinder (130) with the crankshaft (106) therebetween. The second cylinder (160) may extend along the cylinder axis (A2) to be aligned with the first cylinder (130). The second cylinder (160) is configured similarly or symmetrically to the first cylinder (130). In particular, the second cylinder (160) has a top end (162) and a bottom end (164), and is arranged such that the bottom end (164) is located adjacent the crankshaft (106) while the top end (162) is located away from the crankshaft (106). The cylinder assembly (104) further includes a second piston (166) and a permanent magnet (168) secured to the second piston (166). In other examples, the second piston (166) may be at least partially made of a permanent magnet (168). In certain examples, the permanent magnet (168) is made of Neodymium. A top electromagnetic device (170) is disposed at the top end (162) of the second cylinder (160) and configured to generate an electromagnetic field to interact with the second piston (166) when the second piston (166) is positioned adjacent the top electromagnetic device (170). A second piston rod (172) is secured to the second piston (166) and extends through the bottom end (164) off the second cylinder (160). A first rod end (174) of the second piston rod (172) is secured to the second piston (166), and a second rod end (176) of the second piston rod (172) is coupled to the crankshaft (106). Accordingly, a reciprocating motion of the second piston (166) within the second cylinder (160) is converted to a rotational motion of the crankshaft (106), which is then transferred to a rotation of the first and second axles (108, 110).

The second cylinder (160) of the cylinder assembly (104) may further include a bottom electromagnetic device (180) disposed at the bottom end (164) thereof. The bottom electromagnetic device (180) defines a piston rod passage (182) through which the second piston rod (172) extends between the second piston (166) and the crankshaft (106).

As illustrated in FIG. 2, in certain examples, the first cylinders (130) of the plurality of cylinder assemblies (104) may be defined by a cylinder block (230), and the second cylinders (160) of the plurality of cylinder assemblies (104) may be defined by the same cylinder block (230). In other examples, at least one of the first and second cylinders (130, 160) of the plurality of cylinder assemblies (104) may be defined by a separate cylinder block. In yet other embodiments, each cylinder (130, 160) is individually made to be separate from other cylinders (130, 160). Each of the cylinders (130, 160) may be modularized so as to be interchangeable. In this configuration, the cylinders (130, 160) and their associated components are individually replaceable as necessary, as opposed to typical combustion engine blocks. For example, when a certain cylinder (130, 160) or at least one of its associated elements (e.g., a piston, an electromagnetic device, a piston rod, and other components) needs to be repaired or replaced for several reasons (e.g., wear, overheating, and malfunctioning), it can be easily removed from the vehicle for replacement or repair, independently from other cylinders or components. Separate cylinders make it possible to arrange cylinder assemblies in the vehicle in various configurations. These individually-configured cylinders can also be manufactured easily, compared to a single block providing multiple cylinders. In certain examples, the cylinder block (230) may be made of one or more diamagnetic materials. Other materials are also possible to manufacture the cylinder block (230).

The cylinder assembly (104) is operated by a control device (190) included in the vehicle (102). The control device (190) is connected between the electromagnetic devices (140, 150, 170, 180) and a battery power source (e.g., one or more batteries (220)). The control device (190) is configured to provide electrical current through coils of the electromagnetic devices (140, 150, 170, 180) in a timed relationship so that the magnetic fields generated by the coil of the electromagnetic devices (140, 150, 170, 180) interact with the piston permanent magnets (138, 168) to produce reciprocating motion of the pistons (136, 166) within the cylinders (130, 160).

In certain examples, the control device (190) is configured to receive an input from an input device (192) operated by a user, such as a driver of the vehicle (102). The input device (192) may be an accelerator pedal, lever arm, or other mechanical or electrical devices suitable to receive the user's operation command. The input received by the control device (190) may be mechanical and/or electrical in nature. Based upon the received input, the control device (190) selectively provides electrical current to the top and bottom electromagnetic devices (140, 150, 170, 180). The first and second pistons (136, 166) are driven by magnetic fields generated by the electromagnetic devices (140, 150, 170, 180) and the first and second pistons (136, 166). In certain examples, the control device (190) operates to detect a position of the input device (192) and, in response to the position, vary a speed or frequency at which the polarities of the electromagnetic devices (140, 150, 170, 180) switch, thereby varying the rotational speed of the crankshaft (106). The control device (190) may also operate to vary the amount of electricity provided to the electromagnetic devices (140, 150, 170, 180) to control the rotational speed of the crankshaft (106).

By way of example, the control device (190) is configured to provide electrical current to each of the top and bottom electromagnetic devices (140, 150, 170, 180) (e.g., coil assemblies 200 therein (FIG. 4)) such that each of the top and bottom electromagnetic devices (140, 150) produces a pushing force to the first piston (136) as the first piston (136) is positioned to be close to the top and bottom electromagnetic devices (140, 150), respectively, and such that each of the top and bottom electromagnetic devices (170, 180) produces a pushing force to the second piston (166) as the second piston (166) is positioned to be close to the top and bottom electromagnetic devices (170, 180), respectively. As such, as the top and bottom electromagnetic devices (140, 150) are selectively and alternatingly energized, a pushing force is applied to the first and second pistons (136, 166) due to opposing magnetic fields thereby forcing the first and second pistons (136, 166) through a power stroke, which in turn rotates the crankshaft (106). By disposing the first and second pistons (136, 166) in line with the crankshaft (106) therebetween, both strokes of each of the first and second pistons (136, 166) in the opposite directions can be power strokes.

In other examples, the control device (190) may be configured to operate the top and bottom electromagnetic devices (140, 150, 170, 180) to generate a pulling force to the first and second pistons (136, 166), instead of a pushing force as described above.

In yet other embodiments, at least one of the top and bottom electromagnetic devices (140, 150, 170, 180) is configured as a bipolar electromagnetic device, which is controlled by the control device (190) to selectively switch its polarity to push or pull the associated piston (136, 166) depending on the stroke of the piston (136, 166). For example, as the first piston (136) approaches the top electromagnetic device (140) of the first cylinder (130), the top electromagnetic device (140) turns to create a repulsive electromagnetic field causing the first piston (136) to move away from the top end (132) of the first cylinder (130), while the bottom electromagnetic device (150) turns to create an attractive electromagnetic field causing the first piston (136) to move close to the bottom end (134) of the first cylinder (130). Similarly, as the first piston (136) approaches the bottom electromagnetic device (150) of the first cylinder (130), the bottom electromagnetic device (150) turns to create a repulsive electromagnetic field causing the first piston (136) to move away from the bottom end (134) of the first cylinder (130), while the top electromagnetic device (140) turns to create an attractive electromagnetic field causing the first piston (136) to move close to the top end (132) of the first cylinder (130). The top and bottom electromagnetic devices (170, 180) are similarly operated to reciprocate the second piston (166) within the second cylinder (160).

In yet other embodiments, the control device (190) is configured to provide electrical current to at least one of the top and bottom electromagnetic devices (140, 150, 170, 180) to cause the top and bottom electromagnetic device (140, 150, 170, 180) to push and/or pull their respective pistons (136, 166) at any point, thereby accelerating or decelerating the rotation of the crankshaft (106) as necessary. This can further help reducing the vehicle speed or braking the vehicle.

Figure 4:
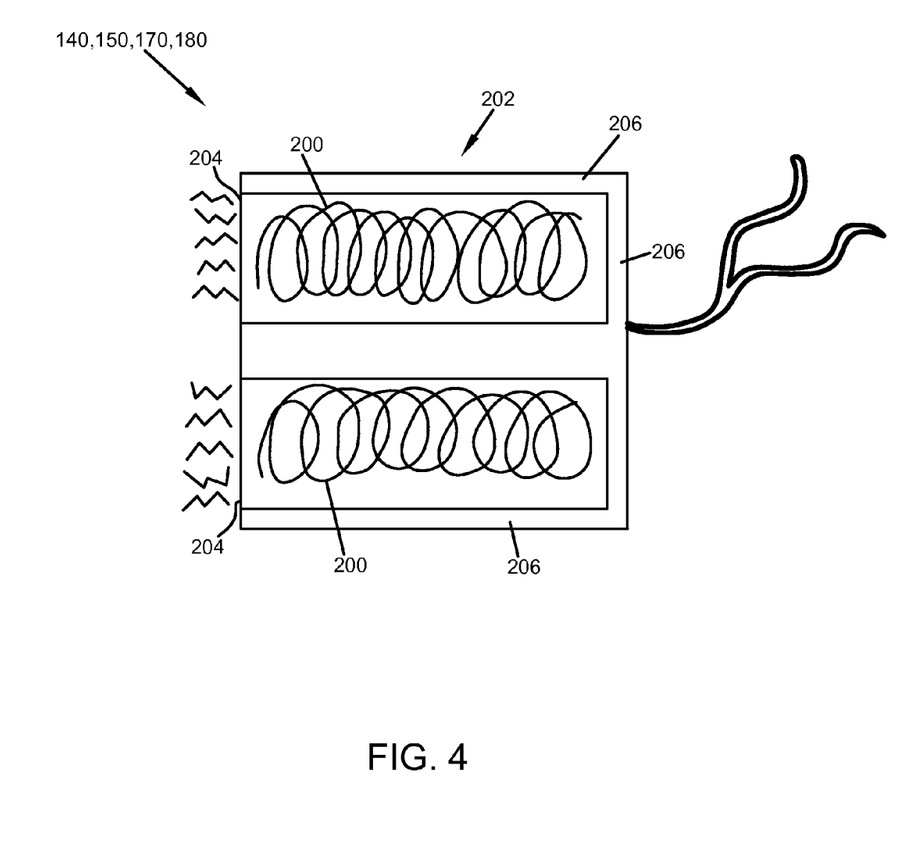
FIG. 4 is a schematic side view of an electromagnetic device mounted in the electromagnetic cylinder assembly shown in FIG. 3.

Referring to FIG. 4, an example of the electromagnetic device (140, 150, 170, 180) is described. The electromagnetic device (140, 150, 170, 180) may include a coil assembly (200) and a housing (202) for at least partially receiving the coil assembly (200) therein. The coil assembly (200) is configured to receive electrical current from the control device (190) so that the electrical current passes through coils of the coil assembly (200) to generate an electromagnetic field. The housing (202) is configured to secure the coil assembly (200) therein. The housing (202) has a first portion (204) arranged to face toward the associated piston (136, 166) within the cylinder (130, 160), and a second portion (206) configured to at least partially surround the coil assembly (200). In certain examples, the first portion (204) is an opening of the housing (202), which is configured to expose the electromagnetic field generated by the coil assembly (200) to the inside of the cylinder (130, 160). The second portion (206) of the housing (202) can be configured to reflect the electromagnetic field generated by the coil assembly (200) and direct it toward the first portion (204) of the housing (202). In certain examples, the second portion (206) of the housing (202) is made of one or more diamagnetic materials. As such, the second portion (206) of the housing (202) is configured to concentrate the electromagnetic field generated by the coil assembly (200) through the first portion (204) of the housing (202). This configuration of the housing (202) improves efficiency of actuating the piston (136, 166) by the electromagnetic devices (140, 150, 170, 180). Some components made of metallic materials in the electromagnetic devices (140, 150, 170, 180) can interact with the permanent magnet (138, 168) of the pistons (136, 166) and pull the pistons (136, 166) when the pistons (136, 166) moves away from the electromagnetic devices (140, 150, 170, 180), thereby interfering the stroke of the pistons (136, 166). In this case, the second portion (206) of the housing (202) can improve the electromagnetic field so that a pushing force is more effectively applied to the pistons (136, 166) moving away.

In certain embodiments, the first portion (204) of the housing (202) is made of one or more non-magnetic materials so that the electromagnetic field generated by the coil assembly (200) reaches the respective pistons (136, 166) therethrough. In other embodiments, the first portion (204) of the housing (202) has an opening to expose the coil assembly (200) to the cylinder (130, 160) therethrough.

The first and second portions (204, 206) of the housing (202) may be made of different materials. In other examples, the housing (202) may be made of a single material without distinguishing the first and second portions (204, 206). The second portion (206) can be configured without the reflective characteristic as described above. In yet other examples, the electromagnetic devices are configured without a housing.

Referring again to FIG. 1, the system (100) includes one or more batteries (220) to store electrical energy in chemical form and supply electrical energy to electrical components of the system (100). For example, the batteries (220) operate to provide electrical energy to the electromagnetic devices (140, 150, 170, 180) and the control device (190). The batteries (220) may also be configured to be rechargeable by a voltage produced when the vehicle (102) slows down.

The system (100) includes an alternator (222) for converting mechanical energy from a paramagnetic brake system (300) into electrical energy, which is then stored in the batteries (220). The alternator (222) can be also used to deliver electrical energy to the electromagnetic devices (140, 150, 170, 180) and the control device (190). In certain examples, the alternator (222) can be configured as various types of generators.

The system (100) includes a heat exchange system (224) configured to cool down various elements of the system (100) that generate heat in operation. For example, the electromagnetic devices (140, 150, 170, 180) generate heat when energized by electrical current, and the heat exchange system (224) operates to transfer the heat from the electromagnetic devices (140, 150, 170, 180) to the environment, thereby cooling the electromagnetic devices (140, 150, 170, 180) and associated elements or parts thereof. In certain examples, the heat exchange system (224) is configured similarly to typical radiation systems used in vehicles. For example, the heat exchange system (224) can include a radiator, a coolant circuit including a coolant expansion tank and a pump, a cooling fan, a thermostat, a heater core, and other components. In other examples, the heat exchange system (224) includes thermoelectric cooling devices utilizing the Peltier effect, thereby eliminating several conventional mechanical components and cooling fluids.

Figure 5:
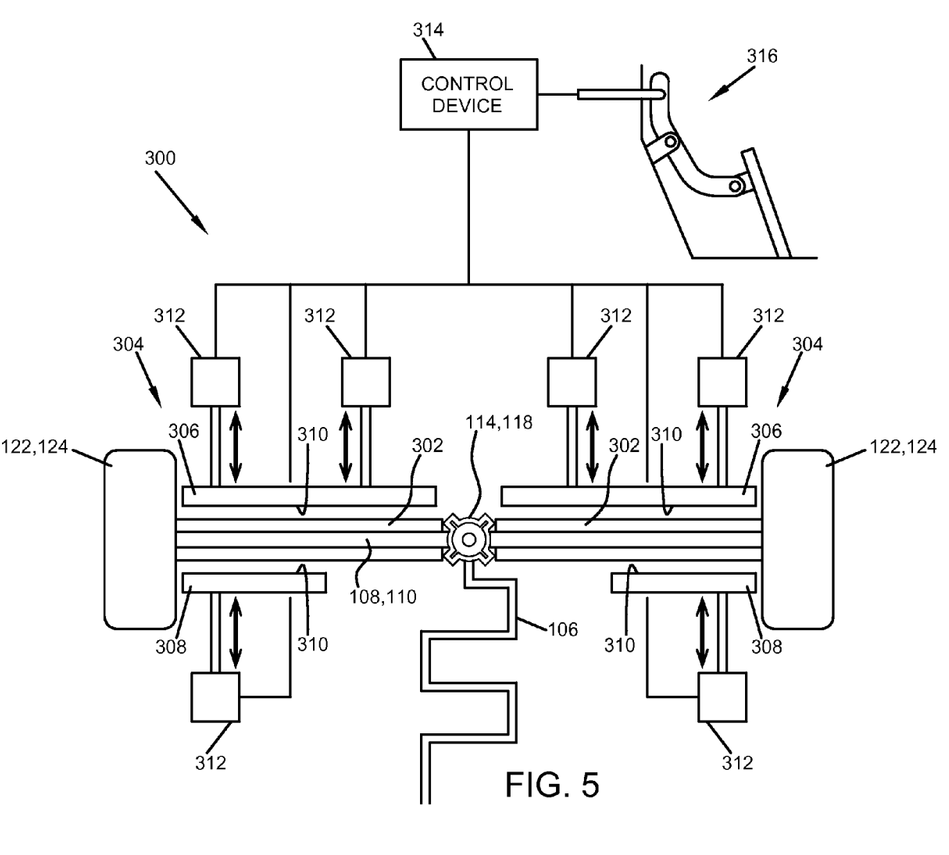
FIG. 5 is a schematic view of a paramagnetic brake system used in the vehicle shown in FIG. 1.
Figure 6:
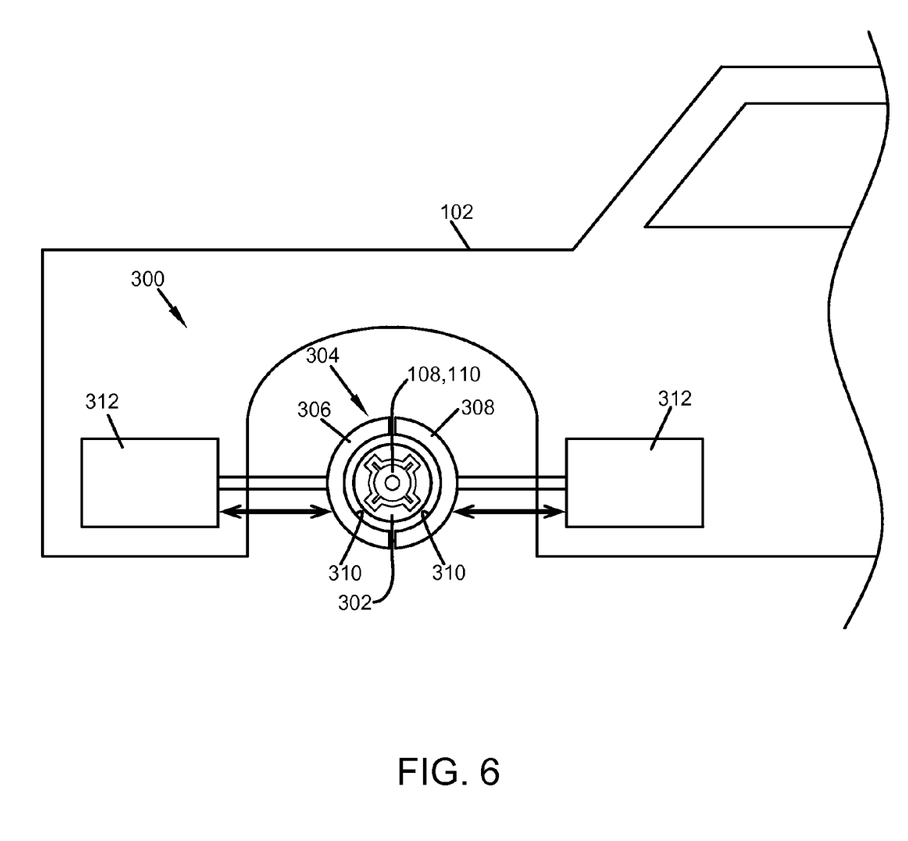
FIG. 6 is a schematic side view of the paramagnetic brake system shown in FIG. 5.

Referring to FIGS. 1, 5 and 6, an example paramagnetic brake system (300) is described. The brake system (300) includes a permanent magnet (302) disposed at least partially around the axle (108, 110) of wheels (122, 124). The brake system (300) further includes a brake member (304) arranged at least partially around the permanent magnet (302) of the axle (108, 110). The brake member (304) may include a first panel section (306) and a second panel section (308), each of which is shaped as a semi-cylindrical panel configured to surround the permanent magnet (302) of the axle (108, 110). The brake member (304) (e.g., the first and second panel sections (306, 308)) includes a paramagnetic material (310) disposed to face the permanent magnet (302) of the axle (108, 110). In certain examples, the brake member (304) is made of one or more paramagnetic materials (310).

The first and second panel sections (306, 308) are movably operated between a first position and a second position. In the first position, the first and second panel sections (306, 308) move toward the permanent magnet (302) close enough to generate a braking effect on the axle (108, 110) of wheels (122, 124) due to the opposite directions of a magnetic field generated by the permanent magnet (302) and a magnetic field generated by the paramagnetic material (310) of the brake member (304). As the first and second panel sections (306, 308) approach the permanent magnet (302) of the axle (108, 110) when the axle (108, 110) rotates, the electromagnetic fields generated by the rotating permanent magnet (302) and the paramagnetic material (310) of the brake member (304) continue to change and induce a voltage under Faraday's Law. In this case, the polarity of the induced electromagnetic fields produces a current, and the magnetic field of the current opposes the change in magnetic flux that produces the current, under Lenz's Law. The opposing force operates as the braking force, slowing down the rotation of the axle (108, 110). As such, as the first and second panel sections (306, 308) move to the first position, the rotation of the axle (108, 110) decelerates to slow down the vehicle (102), and the first and second panel sections (306, 308) do not contact the axles (108, 110) for braking effect. In the second position, the first and second panel sections (306, 308) move away from the permanent magnets (302) to reduce or eliminate the braking effect on the axle (108, 110) and allow the axle (108, 110) to rotate freely.

The paramagnetic material (310) of the brake member (304) and the permanent magnet (302) of the spinning axle (108, 110) can generate a voltage, which can be used to recharge one or more batteries of the vehicle (102).

In certain examples, the first and second panel sections (306, 308) are controlled by one or more actuators (312) that are connected thereto. The actuator (312) may be a linear actuator configured to move the first and second panel sections (306, 308) between the first and second positions. Other types of actuators can also possible. The actuators (312) may be controlled by a control device (314). The control device (314) is configured to receive an input from a brake input device (316) operated by a user, such as a driver of the vehicle (102). The brake input device (316) may be a brake pedal, lever arm, or other mechanical or electrical devices suitable to receive the user's braking command. The input received by the control device (314) may be mechanical and/or electrical in nature. Based upon the received input, the control device (314) controls the actuators (312) so that the first and second panel sections (306, 308) move according to the user's braking command. For example, a position of the first and second panel sections (306, 308) relative to the permanent magnet (302) of the axle (108, 110) is determined by how far the brake pedal is pressed down by a user's foot. In certain examples, the control device (314) is the same as the control device (190) or incorporated in the control device (190).

In some embodiments, the control device (314) can be configured to control the top and bottom electromagnetic device (140, 150, 170, 180) (either directly or through the control device (190)) to push and/or pull their respective pistons (136, 166) and thus decelerate the rotation of the crankshaft (106), depending on the position of the brake input device (316). This can further help decelerating the vehicle (102), along with the braking effect by the paramagnetic brake system (300) as described above.

The vehicle (102) can be of various types, such as motor vehicles (e.g., motorcycles, cars, trucks, and buses), railed vehicles (e.g., trains and trams), wagons, bicycles, watercraft (e.g., ships and boats), aircraft, spacecraft.

The electromagnetic powertrain system according to the present disclosure is configured to provide a simplified electromagnetic powertrain that removes at least some conventional powertrain elements. For example, the electromagnetic powertrain system according to the present disclosure is configured and arranged along a typical location of a driveshaft and other conventional elements, replacing the driveshaft and other elements. The electromagnetic powertrain system of the present disclosure can provide more room for more electromagnetic cylinder assemblies to generate more power. Further, the electromagnetic powertrain system can evenly distribute its weight over the vehicle, reduce the weight of the vehicle, and lower the center of mass of the vehicle, thereby increasing driving performance of the vehicle.

In certain examples, the electromagnetic powertrain system according to the present disclosure can be configured to separately operate each of the front and rear axles. In other examples, the electromagnetic powertrain system according to the present disclosure can be configured to separately operate each of the front and rear wheels. Other configurations are also possible.

In some embodiments, the electromagnetic powertrain system includes a torque converter. The torque converter operates as a transmission in certain applications. For example, when the vehicle tows a trailer, the torque converter is used to aid in accelerating a heavy load of the trailer. In other applications, the torque converter can be used to supply power to various electronic components (e.g., air conditioner or heater) or to recharge the batteries of the vehicle (via the alternator, for example) even when the vehicle is stationary.

In this document, relative terms, such as "lower" or "bottom," "upper" or "top," "front" and "rear," and "left" and "right", may be used herein to describe one element's relationship to another element as illustrated in the Figures. It will be understood that relative terms are intended to encompass different orientations of the device in addition to the orientation depicted in the Figures.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An electromagnetic powertrain for a vehicle, the powertrain comprising:
   a plurality of cylinder assemblies, each of the cylinder assemblies including:
      a first cylinder having a top end and a bottom end;
      a top electromagnetic device secured to the top end of the first cylinder;
      a first piston including a permanent magnet and configured to reciprocate within the first cylinder by an electromagnetic field generated by the top electromagnetic device; and
      a first piston rod extending through the bottom end of the first cylinder and having a first rod end and a second rod end, the first rod end coupled to the first piston, and
   a crankshaft extending along at least a portion of the vehicle, the crankshaft coupled to the second rod ends of the first piston rods of the plurality of cylinder assemblies and coupled to an axle such that reciprocating motions of the first pistons within the first cylinders are converted to a rotational motion of the crankshaft that is transferred to a rotation of the axle, wherein the plurality of cylinder assemblies is arranged along the crankshaft.

2. The electromagnetic powertrain of claim 1, comprising a plurality of the axles, wherein:
   the axles comprise a front axle and a rear axle; and
   the crankshaft is arranged to longitudinally extend between the front axle and the rear axle.

3. The electromagnetic powertrain of claim 1, wherein each of the plurality of cylinder assemblies further includes:
   a bottom electromagnetic device secured to the bottom end of the first cylinder and defining a piston rod passage through which the first piston rod extends between the first piston and the crankshaft.

4. The electromagnetic powertrain of claim 1, wherein each of the plurality of cylinder assemblies includes:
   a second cylinder having a top end and a bottom end, the second cylinder arranged to be opposite to the first cylinder with the crankshaft therebetween;
   a top electromagnetic device secured to the top end of the second cylinder;
   a second piston including a permanent magnet and configured to reciprocate with the second cylinder by an electromagnetic field generated by the top electromagnetic device; and a second piston rod extending through the bottom end of the second cylinder and having a first rod end and a second rod end, the first rod end coupled to the second piston, and the second rod end coupled to the crankshaft such that reciprocating motions of the second pistons within the second cylinders are converted to a rotational motion of the crankshaft that is transferred to a rotation of the axle.

5. The electromagnetic powertrain of claim 4, wherein each of the plurality of cylinder assemblies further includes:
a bottom electromagnetic device secured to the bottom end of the second cylinder and defining a piston rod passage through which the second piston rod extends between the second piston and the crankshaft.

6. The electromagnetic powertrain of claim 1, wherein the top electromagnetic device is a bipolar electromagnet.

7. The electromagnetic powertrain of claim 3, wherein the bottom electromagnetic device is a bipolar electromagnet.

8. The electromagnetic powertrain of claim 1, wherein top electromagnetic device includes:
a coil assembly configured to generate the electromagnetic field; and
a housing securing the coil assembly therein and having a first portion and a second portion, the first portion arranged toward the first piston within the first cylinder, and the second portion at least partially surrounding the coil assembly and configured to direct the electromagnetic field toward the first portion of the housing.

9. The electromagnetic powertrain of claim 8, wherein the second portion of the housing is made of diamagnetic material.

10. The electromagnetic powertrain of claim 1, further comprising:
a first axle;
a permanent magnet disposed at least partially around the first axle; and
a brake member arranged at least partially around the permanent magnet and operable through a brake input device of the vehicle, the brake member including paramagnetic material and movable between a first position and a second position as the brake input device is operated, wherein, in the first position, the brake member moves adjacent the permanent magnet to generate a braking effect on the first axle, and wherein, in the second position, the brake member moves away from the permanent magnet to reduce the braking effect on the first axle.

11. The electromagnetic powertrain of claim 10, further comprising:
a linear actuator operated through the brake member and configured to move the brake member between the first and second positions.

12. The electromagnetic powertrain of claim 10, further comprising:
a battery providing power to operate the top electromagnetic device, the battery configured to be rechargeable by a voltage produced when the first axle decelerates.

13. A powertrain comprising:
a plurality of cylinders, each having a top end and a bottom end;
a plurality of electromagnetic devices, each secured to at least one of the top end and the bottom end of each of the plurality of cylinders;
a plurality of pistons, each including a permanent magnet and configured to reciprocate within each of the plurality of cylinders by an electromagnetic field generated by each of the plurality of electromagnetic devices;
a plurality of piston rods, each coupled to each of the plurality of pistons; and
a crankshaft coupled to the piston rods to convert reciprocating motions of the plurality of pistons to a rotational motion, the crankshaft directly coupled to an axle.

14. The powertrain of claim 13, comprising a plurality of the axles, wherein:
the axles comprise a front axle and a rear axle; and
the crankshaft is arranged to longitudinally extend between the front axle and the rear axle.

15. The powertrain of claim 13, wherein the electromagnetic devices are bipolar electromagnets.

16. The powertrain of claim 13, wherein each of the electromagnetic devices includes:
a coil assembly configured to generate the electromagnetic field; and
a housing securing the coil assembly therein and having a first portion and a second portion, the first portion arranged toward the first piston within an associated cylinder, and the second portion at least partially surrounding the coil assembly and configured to direct the electromagnetic field toward the first portion of the housing.

17. The powertrain of claim 16, wherein the second portion of the housing is made of diamagnetic material.

18. The powertrain of claim 13, further comprising:
a permanent magnet disposed at least partially around the axle; and
a brake member arranged at least partially around the permanent magnet and operable through a brake input device of the vehicle, the brake member including paramagnetic material and movable between a first position and a second position as the brake input device is operated, wherein, in the first position, the brake member moves adjacent the permanent magnet to generate a braking effect on the axle, and wherein, in the second position, the brake member moves away from the permanent magnet to reduce the braking effect on the axle.

19. The powertrain of claim 13, wherein the crankshaft is arranged to replace a driveshaft of a vehicle.

20. A vehicle comprising:
an axle;
a plurality of cylinders, each having a top end and a bottom end;
a plurality of electromagnetic devices, each secured to at least one of the top end and the bottom end of each of the plurality of cylinders;
a plurality of pistons, each including a permanent magnet and configured to reciprocate within each of the plurality of cylinders by an electromagnetic field generated by each of the plurality of electromagnetic devices;
a plurality of piston rods, each coupled to each of the plurality of pistons; and
a crankshaft coupled to the piston rods to convert reciprocating motions of the plurality of pistons to a rotational motion, the crankshaft directly coupled to the axle.

21. The vehicle of claim 20, wherein each of the electromagnetic devices includes:
a coil assembly configured to generate the electromagnetic field; and
a housing securing the coil assembly therein and having a first portion and a second portion, the first portion arranged toward the first piston within an associated cylinder, and the second portion at least partially surrounding the coil assembly and configured to direct the electromagnetic field toward the first portion of the housing.

22. The vehicle of claim 20, further comprising:

a permanent magnet disposed at least partially around the axle; and a brake member arranged at least partially around the permanent magnet and operable through a brake input device of the vehicle, the brake member including paramagnetic material and movable between a first position and a second position as the brake input device is operated, wherein, in the first position, the brake member moves adjacent the permanent magnet to generate a braking effect on the axle, and wherein, in the second position, the brake member moves away from the permanent magnet to reduce the braking effect on the axle.

* * * * *